US011216255B1

(12) United States Patent
Berger (10) Patent No.: US 11,216,255 B1
(45) Date of Patent: Jan. 4, 2022

(54) OPEN COMPILER SYSTEM FOR THE CONSTRUCTION OF SAFE AND CORRECT COMPUTATIONAL SYSTEMS

(71) Applicant: Adam Berger, Woodcliff Lake, NJ (US)

(72) Inventor: Adam Berger, Woodcliff Lake, NJ (US)

(73) Assignee: ezbds, LLC, Woodcliff Lake, NJ (US)

( * ) Notice: Subject to any disclaimer, the term of this patent is extended or adjusted under 35 U.S.C. 154(b) by 0 days.

(21) Appl. No.: 16/207,147

(22) Filed: Dec. 2, 2018

Related U.S. Application Data

(60) Provisional application No. 62/612,356, filed on Dec. 30, 2017.

(51) Int. Cl.
*G06F 8/30* (2018.01)
*G06F 9/50* (2006.01)
*G06F 8/35* (2018.01)
*G06F 8/41* (2018.01)
*G06F 8/51* (2018.01)

(52) U.S. Cl.
CPC ............. *G06F 8/37* (2013.01); *G06F 8/31* (2013.01); *G06F 8/355* (2013.01); *G06F 8/42* (2013.01); *G06F 8/423* (2013.01); *G06F 8/51* (2013.01); *G06F 9/5005* (2013.01)

(58) Field of Classification Search
CPC ............. G06F 8/30–35; G06F 8/37–42; G06F 9/5005; G06F 8/51; G06F 8/423
USPC ................. 717/106–113, 136, 140, 141
See application file for complete search history.

(56) References Cited

U.S. PATENT DOCUMENTS

| 6,269,473 | B1 * | 7/2001 | Freed | G06F 8/20 |
| | | | | 703/22 |
| 6,269,475 | B1 * | 7/2001 | Farrell | G06F 8/33 |
| | | | | 717/113 |
| 6,321,323 | B1 * | 11/2001 | Nugroho | G06F 8/443 |
| | | | | 711/103 |
| 6,427,228 | B1 * | 7/2002 | Wigger | G06F 8/30 |
| | | | | 717/111 |
| 7,506,320 | B2 * | 3/2009 | Bhandari | G06F 8/74 |
| | | | | 370/229 |
| 7,707,563 | B2 * | 4/2010 | Wei | G06F 8/41 |
| | | | | 717/140 |
| 8,140,850 | B2 * | 3/2012 | Horne | G06F 21/16 |
| | | | | 713/176 |

(Continued)

OTHER PUBLICATIONS

Nested Classes, The Java Tutorials, 2011, 3 pages, [retrieved on Oct. 30, 2020], Retrieved from the Internet: <URL:https://web.archive.org/>.*

(Continued)

*Primary Examiner* — Geoffrey R St Leger (57) ABSTRACT

An open compiler system for the construction of safe and correct computational systems. This system allows a user to define multiple computational resources, each of which containing multiple computations, which, together, provide some desired functionality. This system generates the artifacts required to create such computational resources, may verify logical properties of such a system, may integrate user-defined programs in the process of compiling such artifacts, and may allow for the deployment, debugging, and monitoring of such computational resources.

15 Claims, 8 Drawing Sheets

Compilation flow

(56) References Cited

U.S. PATENT DOCUMENTS

| | | | | |
|---|---|---|---|---|
| 8,954,939 B2* | 2/2015 | Mameri | ............... | G06F 8/427 |
| | | | | 717/140 |
| 9,317,268 B2* | 4/2016 | Levijarvi | ............ | G06F 11/1415 |
| 9,619,215 B2* | 4/2017 | Eble | ............... | G06F 8/41 |
| 9,672,084 B2* | 6/2017 | Im | ............... | G06F 9/547 |
| 9,830,146 B2* | 11/2017 | Rector | ............... | G06F 8/71 |
| 9,886,249 B2* | 2/2018 | Pesarese | ............... | G06F 8/41 |
| 2004/0143823 A1* | 7/2004 | Wei | ............... | G06F 8/41 |
| | | | | 717/140 |
| 2004/0194068 A1* | 9/2004 | Warren | ............... | G06F 8/41 |
| | | | | 717/136 |
| 2006/0053414 A1* | 3/2006 | Bhandari | ............... | G06F 8/74 |
| | | | | 717/133 |
| 2009/0178022 A1* | 7/2009 | Horne | ............... | G06F 21/16 |
| | | | | 717/106 |
| 2013/0141428 A1* | 6/2013 | Gipson | ............... | G06F 3/04815 |
| | | | | 345/419 |
| 2013/0205292 A1* | 8/2013 | Levijarvi | ............ | G06F 11/1415 |
| | | | | 717/177 |
| 2014/0189662 A1* | 7/2014 | Mameri | ............... | G06F 8/40 |
| | | | | 717/140 |
| 2014/0366011 A1* | 12/2014 | Rector | ............... | G06F 8/71 |
| | | | | 717/170 |
| 2016/0147511 A1* | 5/2016 | Eble | ............... | G06F 8/41 |
| | | | | 717/144 |
| 2017/0139690 A1* | 5/2017 | Pesarese | ............... | G06F 8/41 |
| 2017/0168792 A1* | 6/2017 | Bhattacharya | ............ | G06F 8/51 |

OTHER PUBLICATIONS

Karasick, M., The Architecture of Montana: An Open and Extensible Programming Environment with an Incremental C++ Compiler, Proc of the 6th ACM SIGSOFT international symposium on Foundations of software eng., Nov. 1998, pp. 131-142, [retrieved on Nov. 12, 2021], Retrieved from the Internet: <URL:http://dl.acm.org/>.*

Source-to-source compiler, Wikipedia, 2015, 8 pages, [retrieved on Nov. 12, 2021], Retrieved from the Internet: <URL:https://web.archive.org/web/20150318234056/https://en.wikipedia.org/wiki/Source-to-source_compiler>.*

Extensible programming, Wikipedia, 2015, 6 pages, [retrieved on Nov. 12, 2021], Retrieved from the Internet: <URL:https://web.archive.org/web/20150321064938/https://en.wikipedia.org/wiki/Extensible_programming>.*

* cited by examiner

Figure 2

Launching a Runnable Environment

Figure 3

Invoking Ideal Flows

<u>Syntax</u>

| | |
|---|---|
| [] | indicates an array |
| #{} | indicates a set |
| {a: b, …} | indicates a map from a to b |
| a.b | indicates access of property b on map a |
| a <- b | indicates assignment of a to value of b |
| a ∈ b | evaluates to true if a is an element of collection b |
| a \ b | the set of all values in collection a that do not appear in collection b |
| a ∪ b | union of all elements of a with all elements of b |
| ∀ a ∈ b. f(a) | produces the set of all values constructed by evaluating f(a) for every element a of the collection b |
| ∪[f(a) ∀ a ∈ b] | union of all collections produced by evaluating f(a) for every element a of collection b |
| find a ∈ b s.t. f(a) | evaluates to the first element a of collection b that satisfies f(a) |
| filter a ∈ b s.t. f(a) | evaluates to all elements a of collection b that satisfy f(a) |
| ∃ a ∈ b s.t. f(a) | evaluates to true if there exists an element a in collection b that satisfies predicate f(a) |

<u>Process for resolving a flow into an abstract block tree</u>

1. Given: *dependencies(a)*, representing the name of all invocations on which invocation a is dependent.
2. Given: *dependants(a)*, representing the name of all invocations that depend on a.
3. Given: ordered-invocations, a reverse-topologically-sorted array of invocation names. The invocation indicated by ordered-invocations[i] may never depend on the result of the invocation indicated by ordered-invocations[i-1].

4. blocks <- []
5. for i <- 0; i < length(ordered-invocations); i++
6.     invocation-name <- ordered-invocations[i]

Figure 7 (continued)

```
7.      block <- find block ∈ blocks
                s.t. invocation-name ∈ block.provides
8.      if block is None
9.      then
10.         block <- {
                        provides:    #{invocation-name},
                        depends-on:  dependencies(invocation-name)
                        body:        []
                    }
11.     end if
12.     remaining-blocks <- blocks \ #{block}
13.     remaining-invocations <-
        ordered-invocations[i+1..length(ordered-invocations)]
14.     provided-vals <- filter d ∈ dependencies(invocation-name)
                    s.t. ∀ inv ∈ dependants(d)
                            inv ∉ remaining-invocations
15.     inner-blocks <- filter b ∈ remaining-blocks
                    s.t. ∃ d ∈ b.depends-on
                            s.t. d ∈ provided-vals
16.     remaining-blocks <- remaining-blocks \ inner-blocks
17.     if length(provided-vals) == 0
18.     then
19.         result-block <- block
20.     else
21.         direct-dependencies <- ∪[dependencies(val) ∀ val ∈
            provided-val]
22.         indirect-dependencies <- ∪[block.depends-on ∀ block
            ∈ inner-blocks]
23.         result-block <- {
                        provides:    provided-vals,
                        depends-on:  direct-dependencies ∪
            indirect-dependencies,
                        body:        inner-blocks ∪ #{block}
                    }
24.     end if
25.     append(blocks, result-block)
26. end for
```

OPEN COMPILER SYSTEM FOR THE CONSTRUCTION OF SAFE AND CORRECT COMPUTATIONAL SYSTEMS

RELATED APPLICATIONS

This subject application hereby claims the benefit under Title 35, United States Code, Section 119(e) of U.S. Provisional Application Ser. No. 62/612,356, entitled "OPEN COMPILER SYSTEM FOR THE CONSTRUCTION OF SAFE AND CORRECT COMPUTATIONAL SYSTEMS," filed on Dec. 30, 2017. The 62/612,356 application is hereby incorporated by reference into this application

STATEMENT REGARDING FEDERALLY SPONSORED RESEARCH OR DEVELOPMENT

Not applicable to this application.

BACKGROUND OF THE INVENTION

1. Field of the Invention

The invention relates to the field of programming, and more particularly to a system and method of constructing a compiler for computational systems, where computational systems consist of a combination of one or more programs implemented in software or in hardware and the software and hardware necessary to run them. The invention additionally relates to the particular field where that compiler is extensible via user-created programs conforming to certain specifications, which may direct the functioning of the compiler and which may, themselves, implement portions of the functionality of the compiler. The invention additionally relates to the particular field where that compiler automatically verifies the logical properties of the target system that the user has indicated must hold.

2. Description of the Related Art

Any discussion of the prior art throughout the specification should in no way be considered as an admission that such prior art is widely known or forms part of common general knowledge in the field. Current compiler systems do not model full systems, comprising multiple programs and their environments, and do not incorporate substantial user-defined operations at compile time.

Modern computational systems are often composed of many programs running as many communicating processes on many machines, both virtual and physical, dependent on different operating systems, configurations, libraries, files, networking, and other required artifacts (those operating systems, configurations, libraries, files, networking and other required artifacts collectively comprising the environment). Containerization, virtual machines, and so-called serverless computing have emerged as some examples of different schemes for combining programs with their dependencies in order to avoid problems associated with building programs separately from their environment and deploying them separately from the construction and deployment of the environment upon which they depend. However, even with the introduction of these techniques, the designers and programmers of computational systems still must deal with separate source artifacts for each program as well as separate source artifacts for some or all of the elements comprising the environment. In order to create and modify systems that maintain desired correctness properties, including basic functionality, scalability, error handling, security guarantees, maintainability, and extensibility, the system designers and programmers must construct a mental model of the interactions between all of the individual programs and their environments. In order to construct such a mental model, the designer or programmer is forced to piece together the programs and environment by looking at the source code of each program, applying their understanding of the methods by which environments are constructed, configuration is applied, how and where processes are deployed, and by what names or at which addresses and ports they are addressable. There currently exists no reified representation of the interactions between programs or between programs and their environment even though it is exactly that representation that the designers and programmers must mentally manipulate to build effective and safe computational systems.

Thus, a need exists for a compiler system that models multiple programs and their environments simultaneously, producing as output the full set of programs and environment configuration defined in the source code provided. Further, this system must permit expressive constraints to be placed upon the interaction between each component defined in the source code in order to ensure the proper functioning of the system produced.

BRIEF SUMMARY OF THE INVENTION

In view of the foregoing background, a system and method of constructing a compiler for computational systems is disclosed. One embodiment of the present disclosure relates to an electronic system that, having received (1) a properly-formatted representation of the scopes, modules, and flows (defined below) that comprise the target system, (2) a possibly-empty set of module combinators, abstract block tree simplifiers, scopes, runners, and runnable environment and artifact loaders (defined below), and (3) a possibly-empty set of logical assertions and requirements associated with modules and inputs and outputs of modules and flows as well as implication assertions to propagate logical assertions across arbitrary module and flow invocations, verifies the logical properties of the described system and generates one or more compiled artifacts that represent the scopes and flows defined in the input representation. In one embodiment, the system generates source code and configuration files that encompass the functionality defined by the provided flow definitions for every defined scope. The source code may conform to any computer language or languages, may make use of any features within that language or languages, and may be compiled by any compiler for that language or languages.

According to one aspect of the disclosure, the system generates an intermediate representation of the invocations comprising the portion of each flow that resides within each scope and then converts such intermediate representations into abstract syntax trees by querying the module combinator associated with each invocation to retrieve its portion of the abstract syntax tree. According to another aspect of the disclosure, each such abstract syntax tree may conform to any format that the associated scope accepts and the system then converts each such abstract syntax tree into program source code and configuration files by querying the scope containing the modules associated with the invocations from which the abstract syntax tree was derived. According to another aspect of the disclosure, the system directs the compilation of those generated source code and configuration files into compiled artifacts by querying the scope containing the modules associated with the invocations from which the source code and configuration files were derived. According to another aspect of the disclosure, the system directs the staging of those compiled artifacts in a staging environment. According to another aspect of the disclosure, the system directs the deployment of those compiled artifacts from the staging environment to a production environment by querying the specified deployment runners.

In another embodiment, the disclosed system enables the designers and programmers interacting with it to define logical properties that must be true of the data passed to the inputs of modules or flows, logical properties that are guaranteed of the outputs of modules or flows, logical properties that are assumed to be true of certain values, logical implications linking properties of inputs to modules or flows to properties of outputs of modules or flows, or logical properties required of data that passes into or out from a scope. In this embodiment, the logical properties and implications may be represented in any suitable language that represents a system of logic. Some examples of such languages include but are not limited to: Horn clauses, S-expressions with the and, or, not equality, etc. logical operators, or mathematical notation. According to one aspect of this system, such logical properties may be automatically proven to hold in all cases by showing that the logical assumptions and logical assertions on all inputs, combined with the logical implications, are sufficient to satisfy all logical requirements on outputs as well as all requirements of the values entering and exiting scope boundaries.

In another embodiment, the disclosed compiler system provides extension points at which user-created programs may be supplied to control the operation of the compilation of the user-defined computational system. The ability to run user-created programs in such a manner allows for the disclosed system to remain agnostic to the technologies that comprise the target computational system and provides the even more important advantage of allowing for a separation of concerns amongst subsets of designers and programmers. Some designers and programmers at some times may concern themselves solely with defining the properties of the runtime system as well as abstractions upon which feature-related functionality may be built. These more infrastructure-level concerns may often be confined to the user-provided extension code in scopes and module combinators, freeing the designers and programmers focused on feature-related functionality development to focus exclusively on that business logic. Further, future designers and programmers seeking to understand the target computational system are able to focus separately on the infrastructure-level structure or the business-oriented structure.

Terms

The following is a glossary of terms used in this disclosure. In no case are the specific names attributed to the invented classes of functionality intended to be limiting of the scope of the disclosure. The disclosed system is intended to encompass both the structural and functional equivalents thereof. In all instances where an element is said to be comprised of multiple sub-elements, it is intended to be the case that any of those sub-elements may or may not be present and any such combination is intended to fall within the scope of the present disclosure.

Scope—A scope may represent anything in a computational system that may contain state or may otherwise be said to exist for a duration that exceeds that of a single processing step. For example, operating system processes, containers (e.g. LXC or Docker containers), virtual machines, databases, firewalls, subnets, or even entire datacenters could be represented as scopes. Scopes may be arranged by the designer or programmer into hierarchies whereby one scope is said to "reside within" another scope. When defining scopes, the designer or programmer is really defining a template from which any number of incarnations of that scope may ultimately be realized when the scope is deployed or in the process of its ongoing operation. The disclosed system utilizes user-provided programs, provided in the form of runnable environments (defined below) to generate the compile-time artifacts of scopes. Scopes generate one or more of the following compile-time artifacts: generated source files, compiled artifacts, staged artifacts, configuration files, files to assist in the process of monitoring and debugging, or files to assist in the deployment of the incarnations of the scope.

Flow—A flow is a logical computation that may take place within one or more scopes and is composed of the invocation of one or more module instances (defined below), some of whose outputs are directed to the inputs of one or more other module instances, some of whose inputs are provided with each invocation of the flow as parameters to the flow invocation, some of whose outputs are returned from the flow invocation as the resulting output or outputs of the flow invocation, and some of whose inputs are set to be literal data provided at the time of the definition of the flow, possibly containing templated variables that are provided at a later compilation step but prior to deployment.

Module—A module comprises a source code library and associated metadata that the disclosed system uses to determine what inputs may be provided to invocations of the module and what sets of outputs may be returned by such invocations. Module source code is written in any programming language. Some modules may require some initialization logic which runs once upon the creation of their containing scope. Such modules are often thought of as stateful modules because their state must be initialized. Modules may define an initialization procedure that is run at the initialization of the scope. Furthermore, some modules may accept configuration information which may further direct the number and nature of the inputs and outputs of the module as well as the logical properties associated with it. Modules are instantiated in a scope and flows consist of invocations of such module instances. Each module invocation may produce only one set of output values but each module may declare the ability to produce any number of such output types. Module combinators (defined below) must be able to generate target source code that can determine the type of output a given invocation generated and continue the running program flow only for those subsequent module invocations that make use of that set of output values. By default, no module invocation may be passed two arguments where one argument is derived from one output type of any ancestor module and another argument is derived from another output type of the same ancestor module. Modules may, however, declare some sets of parameters as only requiring one of the given parameters to be provided. Such sets of parameters may be provided arguments that violate this identical output type requirement. Values derived from separate output types of the same module invocation may be provided as arguments to such sets of parameters. The resultant code will invoke the module regardless of which output type was produced. This allows for, for example, default values to be provided in place of error results. For example, a module (M) may declare itself able to produce an error output type that consists of an identifier (A) and a message (B) as well as a success output type that consists of a result (C) and a status (D). Each output type may contain any number of output values and a module may declare any number of output types. A subsequent module invocation (E) may take A and B as inputs. Invocation E will only be executed at runtime if the invocation of module M resulted in an error output type. Another subsequent module invocation (F) may take C and D as inputs. Invocation F will only be executed at runtime if the invocation of module M resulted in a success output type. If a module invocation (G) is defined to take A and C as inputs, the system would yield an error because A and C are from two separate output types. However, if module G was annotated to indicate that A and C are part of a parameter set, the invocation would be allowed and only one of A or C would be available to be provided as an argument at runtime.

Module Combinator—A module combinator is a computation that transforms a description of an invocation of a module instance, provided in a well-defined format herein labeled an abstract block, into a representation of a portion of an abstract syntax tree in a well-defined format, based on the type of scope that contains the invoked module. Module combinators are provided as runnable environments (defined below), which implement an ideal flow (defined below).

Runnable environment—A runnable environment comprises a data description of a set of runnable scopes (defined below) as well as a data description of a set of runnable flows (defined below) that may be invoked by an actor external to the runnable scopes. The disclosed system provides numerous extension points whereby designers or programmers making use of the system may inject their own functionality to direct the disclosed compilation process. In all cases, that injected functionality takes the form of invocations of runnable flows on specified runnable environments.

Runnable scope—A runnable scope comprises a data description of a means of loading a computational artifact in a computational environment (an artifact loader), a data description of the configuration of that artifact loader including an abstract "location" at which said artifact loader may find the desired computational artifact, and a data definition of a means of running that computational artifact in a computational environment (a runner). That computational environment may be the computer system presently executing the runnable environment in which the runnable scope is declared, it may be an external computer system that the computer system presently executing the runnable environment can connect to and control, it may be a virtualized computer system either on the computer system presently executing the runnable environment or external to it, or it may be any other system capable of performing computation. Similarly to scopes, a runnable scope is a template from which any number of incarnations may ultimately be realized when the runnable scope is run or in the process of its ongoing operation. For example, a runnable scope may consist of a specification pointing to the builtin URL download artifact loader, an artifact loader configuration specifying a URL from which the runnable scope artifact may be downloaded, and a specification pointing to the builtin native executable runner. When the disclosed system needs to launch such a runnable scope, the builtin URL download artifact loader will download the file at the provided URL to the local computation environment and the builtin native executable runner will execute the local file.

Artifact loader—An artifact loader is responsible for loading a computational artifact and may accept a data description of a configuration to direct the artifact loader's operation. The artifact loader may load a computational artifact from a remote system and it may place such an artifact on the computational system presently executing the runnable environment or on any other computational system. The artifact loader will usually render the computational artifact into a state such that it may be executed after the artifact loader completes its operation. Some examples of a computational artifact that an artifact loader may load are, without limitation and provided only for pedagogical purposes: an executable file containing a native software process, a bundle of code intended to be interpreted by an interpreter, a virtual machine image, a container image, a template for the creation of computational resources in a cloud environment, an image intended to be transferred to a hardware device such as an FPGA, a schematic intended to be fabricated into a custom piece of hardware, or any other artifact that may eventually perform some computation. In the disclosed system, there are two types of artifact loaders: builtin and custom. Builtin loaders are provided by an embodiment of the disclosed system and may be referred to by a name or other identifier in interactions between a designer or programmer and the disclosed system. Custom loaders are implemented as runnable environments that provide a well-known ideal flow (defined below) that may be invoked by the disclosed system to provide the functionality of an artifact loader. Since custom loaders are themselves runnable environments, the artifact loaders required in their runnable environments may also be either builtin or custom. Every such chain of artifact loaders must eventually end in a builtin loader. For example, a custom artifact loader may consist of a runnable environment that exposes a runnable flow that downloads files from an FTP site. That custom artifact loader may indicate in its runnable environment that it be loaded by the builtin artifact loader that downloads artifacts via HTTP GET requests. Thus, the custom artifact loader may be hosted at an HTTP address from which the builtin loader will download it and, when run, may download other artifacts via FTP.

Runner—A runner is responsible for running a computational artifact on a computational system. There are two types of runners: builtin and custom. Builtin runners are provided by an embodiment of the disclosed system and may be referred to by a name or other identifier in the interactions between a designer or programmer and the disclosed system. Custom runners are implemented as runnable environments that provide a well-known ideal flow (defined below) that may be invoked by the disclosed system to provide the functionality of a runner. Since custom runners are themselves runnable environments, the runners required in their runnable environments may also be either builtin or custom. Every such chain of runnable environments must eventually end in a builtin runner. For example, one type of runner may be implemented as a native executable that accepts arguments passed via operating system environment variables, invokes an HTTP endpoint with a request containing a JSON representation of the data in the environment variables, and returns the result of the HTTP invocation by writing that result in JSON format to its standard output file. That runner may declare in its runnable environment that it should be invoked by another runner that accepts arguments as protocol buffer-encoded data passed to its standard input file, invokes the runner that it wraps by passing those arguments via operating system environment variables to another native executable and translates the JSON-formatted data that that executable sends to its standard output file into protocol buffer-encoded data that it writes to its own standard output file. Finally, that runner may indicate in its runnable environment that it should be invoked by the builtin runner that invokes a native executable and passes the arguments the disclosed system provides it to the indicated executable as protocol buffer-encoded data written to its standard input file and returns data to the disclosed system by reading the protocol buffer-encoded data written to the invoked process's standard output file. With such a chaining of runners, any computational artifact, communicating via any means, may be invoked from the disclosed system.

Runnable flow—A runnable flow is a named set of functionality implemented within one or more runnable scopes that is exposed to invocation by external actors by means of a runner. Runnable flows may declare themselves to conform to one or more named ideal flows. For example, a runnable flow may be comprised of a web service that exposes an endpoint that accepts a JSON-formatted payload over the HTTP protocol on a particular TCP port of a runnable scope that is realized as a container. In that example, the runner would be responsible for creating an HTTP request with a JSON-formatted payload comprised of data from a provided data request to the correct TCP port at the IP address of the container and translating the corresponding response into a suitable data representation.

Ideal flow—An ideal flow comprises a globally-unique name and an associated expectation for the structure of the provided data, the structure of the returned data, and the transformation and side effects that result from such an invocation. The globally-unique name may be, by way of example only, a UUID or a reverse fully-qualified domain name. For example, an ideal flow named org.ulvm.artifacts.load might be used as the interface for any custom artifact loaders. Such custom artifact loaders may be expected to receive any map structure representing the configuration of the artifact loader, may be required to return any map structure representing the information needed to address the loaded artifact, and might be expected to preserve the invariant that, after returning, the information returned will address a valid artifact that has been properly staged for launching.

DETAILED DESCRIPTION OF THE INVENTION

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign thereto.

Further, it should be noted that, as recited herein, the singular forms 'a,' "an," and "the" include the plural referents unless otherwise stated. Additionally, the terms "comprises" and "comprising" when used herein specify that certain features are present in that embodiment, however, this phrase should not be interpreted to preclude the presence or addition of additional steps, operations, features, components, and/or groups thereof.

Techniques described herein relate to a system that may provide mechanisms by which designers and programmers may describe the elements of a target computational system as well as the flows that comprise the intended functionality of the target computational system, may provide the ability for designers and programmers to assert required properties of those systems, may provide mechanisms for the verification of those properties, may provide for the compilation of the descriptions of computational systems into realizations of such systems in various target languages or in conformance with various target technologies, may provide mechanisms to direct the building of those target language or target technology artifacts into deployable artifacts, and may provide mechanisms for the deployment of those artifacts into target computational environments.

The disclosed system allows designers and programmers to describe a system as a set of hierarchical scopes, a set of modules provided by each scope, and a set of flows. Each scope denotes a template from which one or more computational resources are created when the target system is instantiated or deployed, each module represents a source code or machine code element that may be invoked by an application composed in the target programming language or system, and each flow represents a combination of such modules, potentially across multiple scopes, such that the inputs of some modules are set to be either static data, arguments provided to the flow, or the result of the outputs of other modules. With these fundamental building blocks, any currently-existing or not-yet conceived computational system may be modeled and, from such a model, such a system may be verified, assembled, monitored, debugged, and deployed. One useful example of such a target system is one that is composed of many software processes, written in many programming languages, all deployed to multiple machines, and communicating with one another over a computer network. Whereas state-of-the-art techniques would represent such a system as a separate set of source code files for each process and a separate set of deployment files or manual processes that run the compiled artifacts on various machines, the disclosed system allows designers and programmers to model the system—and, thus, reason about it—as a single, cohesive unit. The primary advantages of modeling scopes, modules, and flows within a single system is the clarity of understanding gained by explicitly co-modeling those elements that are each currently represented as independent source artifacts. The presently disclosed invention allows for the generation of source artifacts such as are presently used in state-of-the-art techniques from this novel co-modeled set of scopes, modules, and flows. Thus, all of the benefits of the state of the art tooling may be brought to bear on these systems while the additional benefits derived from a co-modeling of computations with their environments may also be realized. As presently modeled in other state-of-the-art systems, there is no clear distinction between a module and a flow. As a result, systems are plagued by a lack of reusability; logic that should inhabit a flow is allowed to slip into the layer of modules, which hinders the ability to reuse the module in another flow, and logic that should be pushed into a module is preserved in the layer of flows, which requires duplication of such logic in any flow that reuses that module.

For example, many modern software systems rely on libraries—one type of module—to provide inter-process communication capabilities. Any responsible use of such libraries requires the user to configure various time thresholds such that any requests that take longer than the threshold amount of time are considered failed as well as the ability to retry some failed requests and the ability to stop issuing requests to some remote parties for some amount of time after experiencing a threshold number of failures from that party. In many modern systems, each of these concerns is often dealt with at every call site into the inter-process communication library, where each of these call sites is often contained in what would be considered a flow by the disclosed system. In the disclosed system, each concern could be modeled as a reusable module and all of these modules could be combined into a higher-level reusable module that could be invoked from various flows. In addition, each module and flow could be annotated with required properties of their inputs and outputs, which would allow the designer to ensure that any output of the inter-process communication library was eventually fed into a module that handled retrying failed requests and that any input to the inter-process communication library had already passed through some module that determined whether the request should be allowed based on the number of previous failures. Additionally, a similar property could be enforced by annotating each scope, indicating that any value leaving or returning to the scope has some retry-related and circuit-breaking-related properties asserted on it. Permitting such an assertion at the scope level allows a separate, infrastructure-oriented set of engineers to make such an assertion while designing the structure and guarantees of specific types of scopes, without regard for the specific modules or flows which instances of those scopes will implement. The implementers of the flows that make use of modules from such scopes would then no longer need to specifically remember to implement those concerns because such implementation would be required and verified by the disclosed compiler. Thus, the disclosed system allows desired invariants of the target systems to be expressed, enforced, and verified.

Further, many networked systems today are built such that the source code for many processes contain calls out to other processes at a specified IP address and port or calls to place some information on a queue for later handling by another process. The links between the calling and receiving process are completely lost in the source artifacts. In fact, the source artifacts rarely contain all necessary information to trace the flow of processing from one process to another. In the disclosed system, all flow information is encoded in flows and, because flows consist of connections between modules which are associated with scopes, the flow of data from scope to scope, which in many cases means from process to process, is readily evident. This allows programmers and designers to more readily understand, in their totality, the systems on which they work. Perhaps of equal importance, this allows the disclosed system to verify that the targets of these inter-scope calls are configured to actually exist and to respond when communicated with at the specified locations and in the specified formats, encodings, and protocols.

In some embodiments, modules and flows may be further annotated with transformers. Transformers are flows that may be run before or after any invocation of the indicated module. There are four possible configurations in which transformers may be run: in the scope of the calling module before the the call is made, in the scope of the receiving module before the call is made, in the scope of the receiving module before an output is returned, and in the scope of the calling module after an output is returned. Typically, when static data, flow parameters, or one module's output is wired to another module's input, the resulting target code will include an invocation of the receiving module such that the arguments to that invocation include the scope-accessible (often in-memory) inputs. When making a call across a scope boundary, however, there can be no presumption of the accessibility of the flow parameters or output of a module in one scope when invoking a module in another scope. This is the primary use of transformers: they allow for the transparent transference of data from one scope to another to preserve the designer's or programmer's model of a flow as an invocation of various modules, leaving the mechanism by which the data is transferred from scope to scope as a separate concern. Transformers are defined as a combination of a specification of the configuration in which they are to be run (calling scope, pre-invocation; receiving scope, pre-invocation; receiving scope post-invocation; or calling scope post-invocation), a flow to include, a set of modules to possibly add to the affected scope, and a test to determine whether the transformer should be applied. The test is written in any language that is capable of representing logical predicates and may refer to properties of the calling or receiving scope. By way of example, a calling scope, pre-invocation, transformer may contain a flow that transforms input data to the appropriate format and sends it over the network in the form of an HTTP call. A receiving scope, pre-invocation transformer may contain a flow that listens for an HTTP call and converts the HTTP request into suitable input data. A receiving scope, post-invocation transformer may contain a flow that converts the output data from a module into an HTTP response and sends the response. Finally, a calling scope, post-invocation transformer may contain a flow that transforms the HTTP response into appropriate output data.

Further, in some embodiments, the provided input into the disclosed system, in addition to or instead of a representation of scopes, modules, and flows, may include source-level macros. Such macros are computations or functions that convert some input data into a representation of scopes, modules, flows, or portions of flows as well as requested additions to the set of modules included in any scope, and requested additions to the set of module combinators, scopes, or source-level macros. These source-level macros are supplied as runnable environments that provide a flow conforming to a well-known ideal flow. The flow is invoked with whatever arguments are supplied to the source-level macro in the input files as well as a full representation of all scopes and associated modules and all module combinators. The invocation of the source-level macro in the input file is replaced by one component of the result of the invocation and the defined scopes are updated to reflect the additional modules and scopes requested by the other components of the result of the invocation. This procedure is repeated until no source-level macros remain in the input files.

Figure 1:
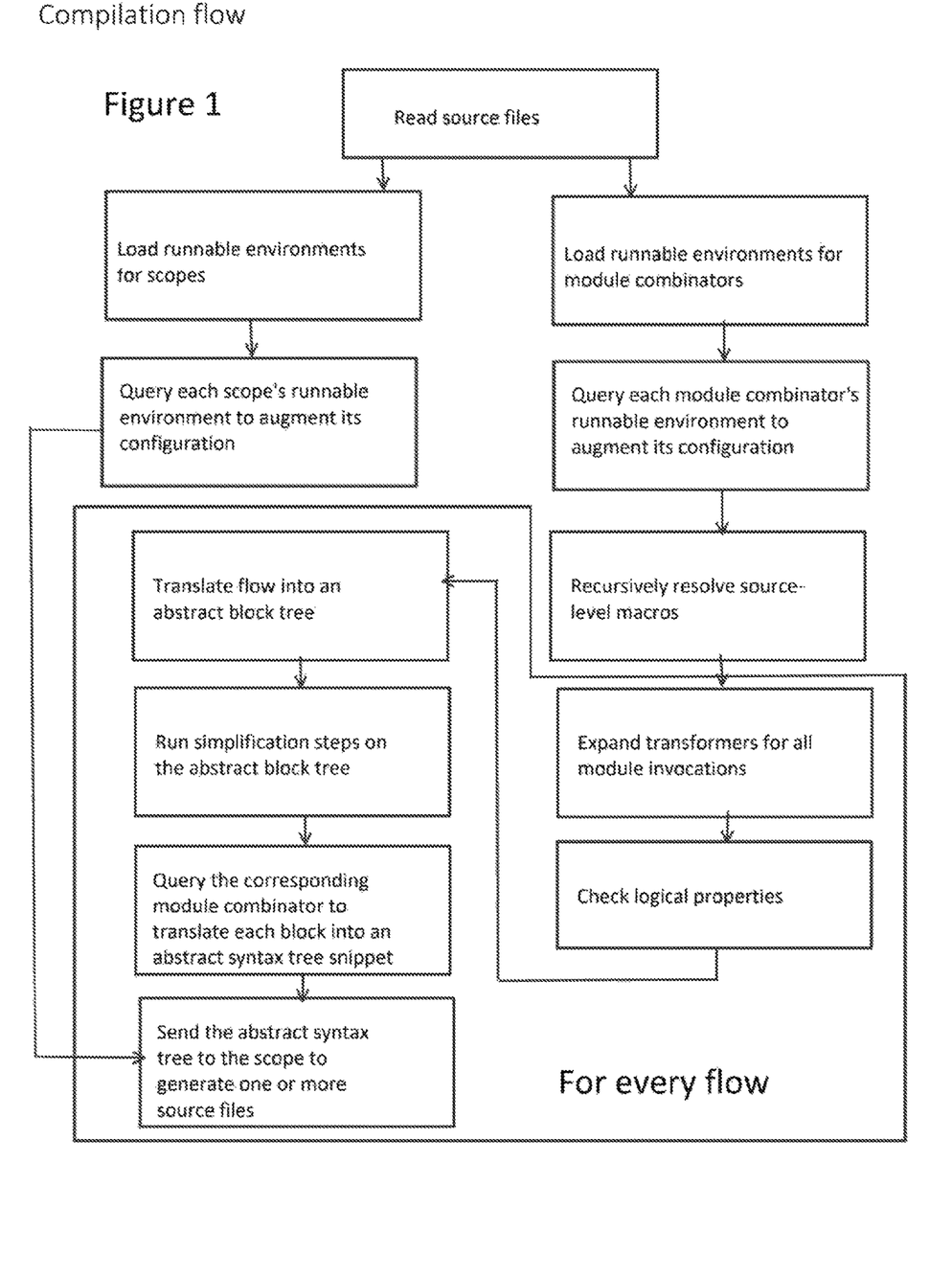
FIG. 1 is a flow diagram representing the overall functioning of the disclosed compiler system.

FIG. 1 details the high-level processing steps involved in compiling a system description written in terms of scopes, modules, and flows, into a set of programming language and configuration artifacts. First, all source files are read by the disclosed system. These files contain the description of each scope, the modules that it provides, and the definition of all flows. These files may additionally include logical assertions and requirements, definitions of module transformers, source-level macros, and module combinators. The source files may be written in any language capable of representing the features associated with these elements. In fact, many such languages are imaginable and some embodiments of the system will allow for the designer or programmer to write the system in any such language so long as a runnable scope is provided which may transform such a language into a common representation of these elements. Such embodiments will operate solely on this common representation— for example, S-expressions augmented with representations of maps and sets—and may require no knowledge of any of the possible source languages. In such embodiments, the transformation into the common representation should be performed by invoking a well-known ideal flow of a runnable environment and this must happen prior to further processing. In other embodiments, the common representation is read directly from some electronic medium. This could include files on a single computer, files accessible from the internet, or any other mechanism of storing data. Thus, system designers and developers may work in any language representation that they prefer, with syntax with which they are most familiar, while ensuring that the resultant common representation may be shared, edited, and verified by any of them.

Figure 2:
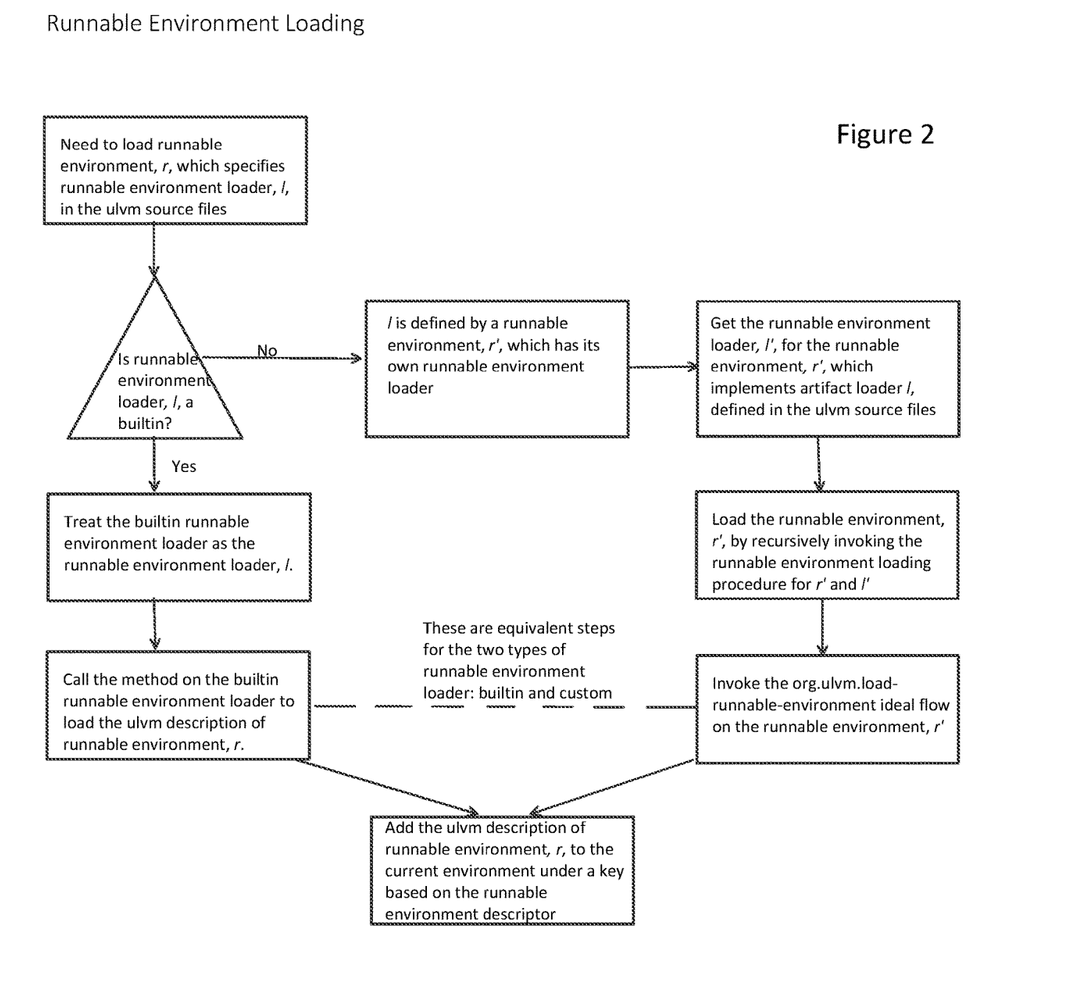
FIG. 2 is a flow diagram representing the process by which the disclosed compiler system loads a runnable environment.
Figure 3:
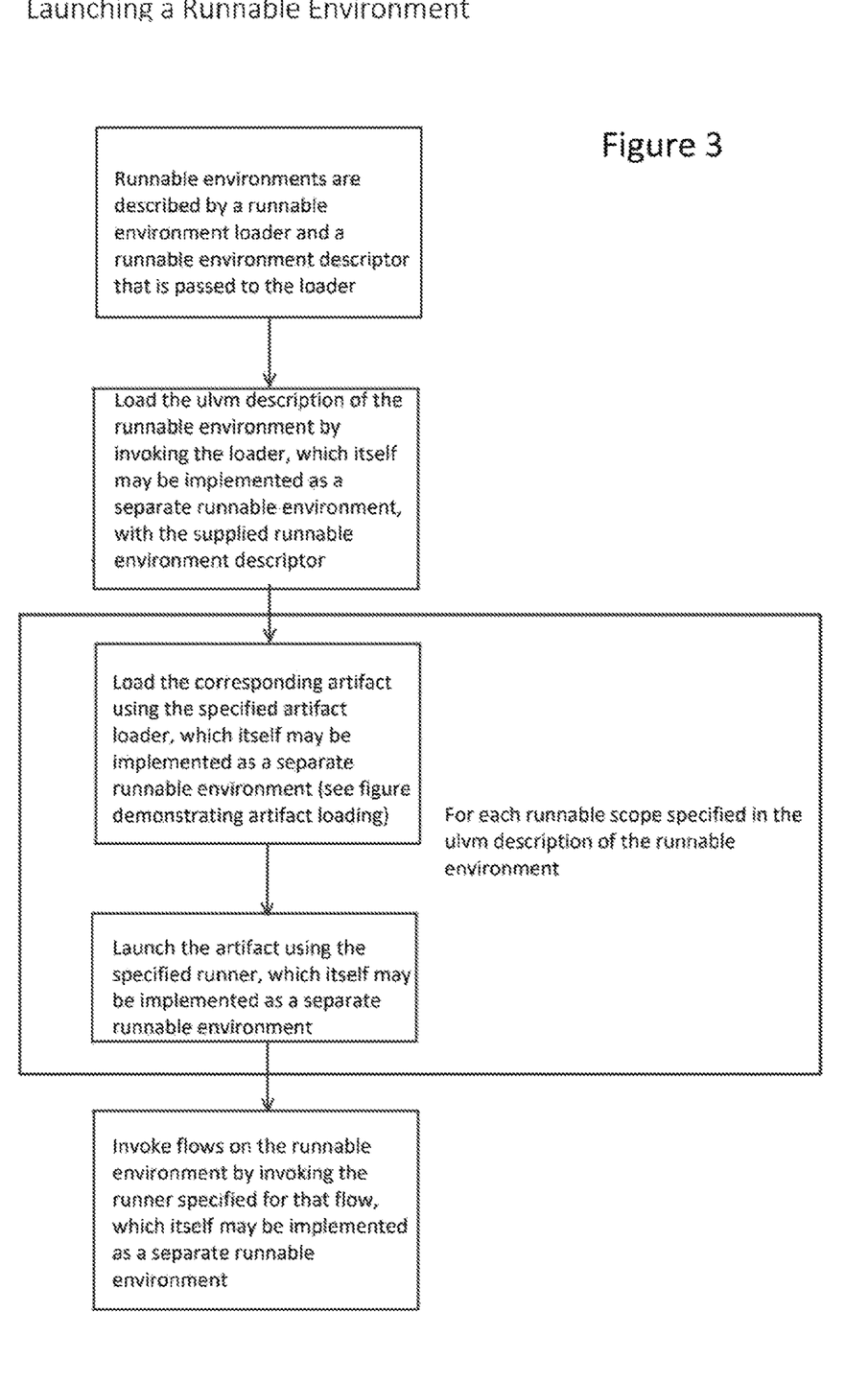
FIG. 3 is a flow diagram representing the process by which the disclosed compiler system launches a runnable environment.
Figure 4:
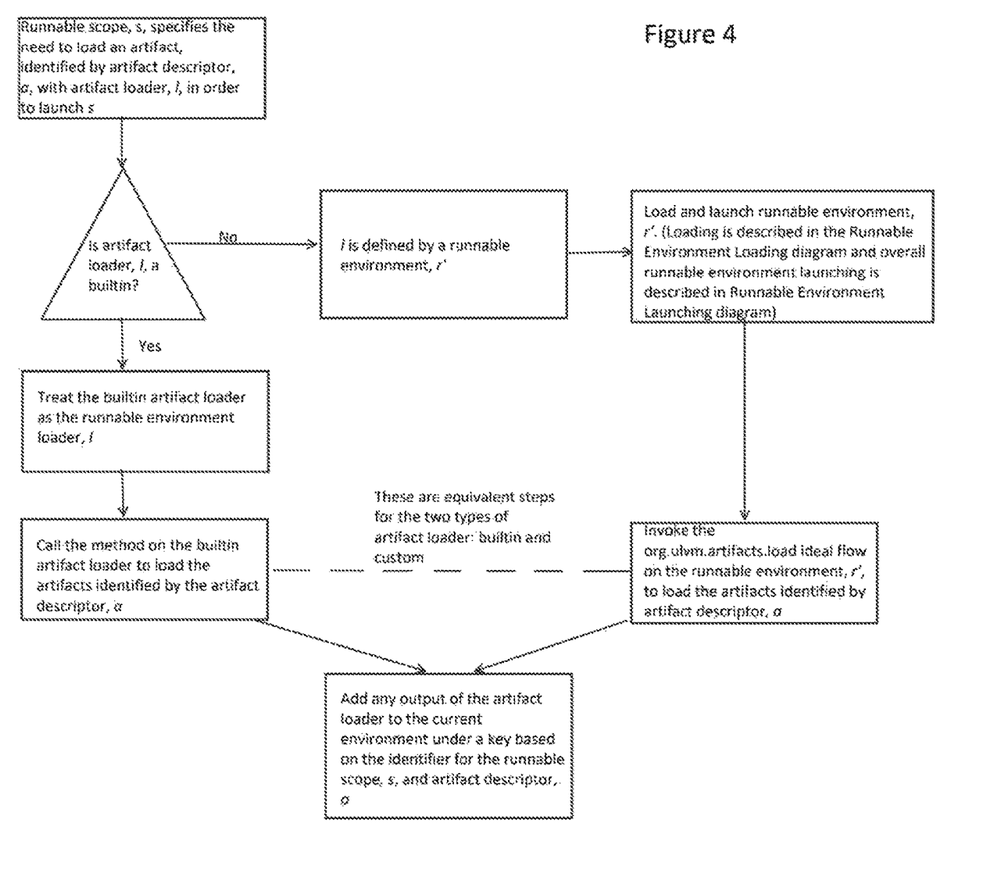
FIG. 4 is a flow diagram representing the process by which the disclosed compiler system loads artifacts.
Figure 5:
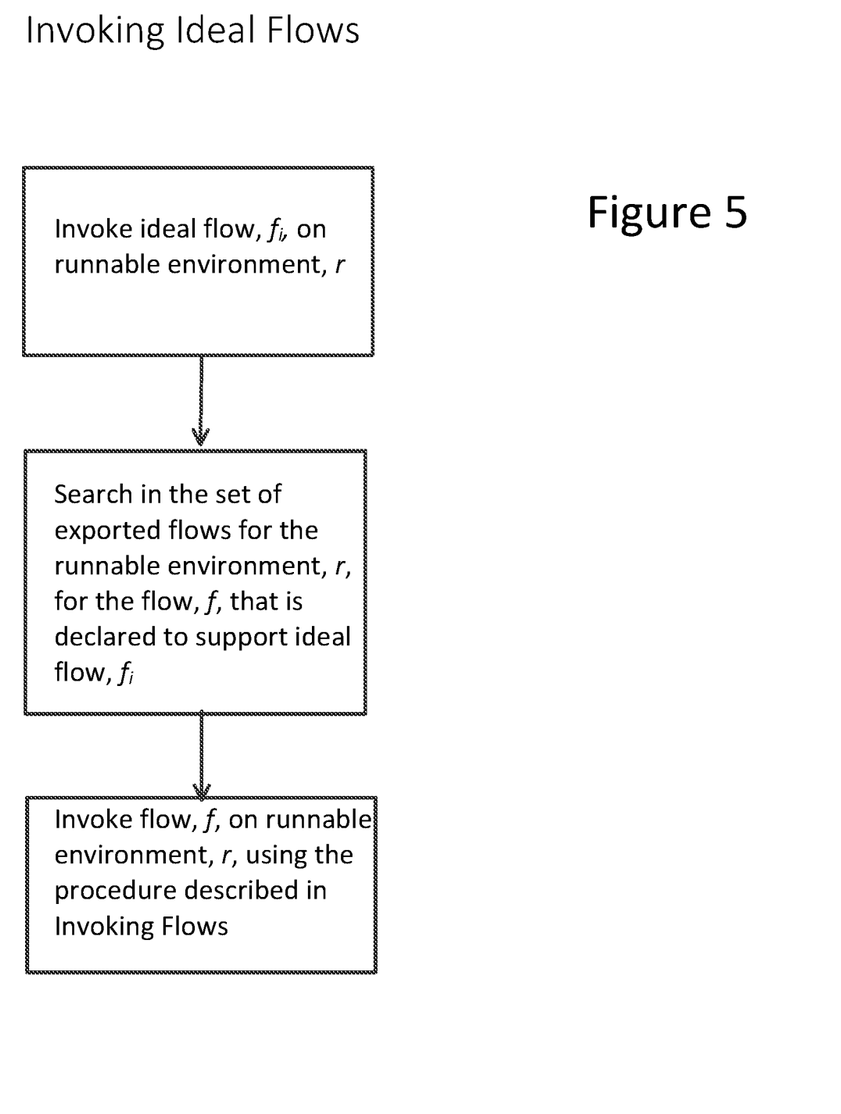
FIG. 5 is a flow diagram representing the process by which the disclosed compiler system invokes ideal flows.
Figure 6:
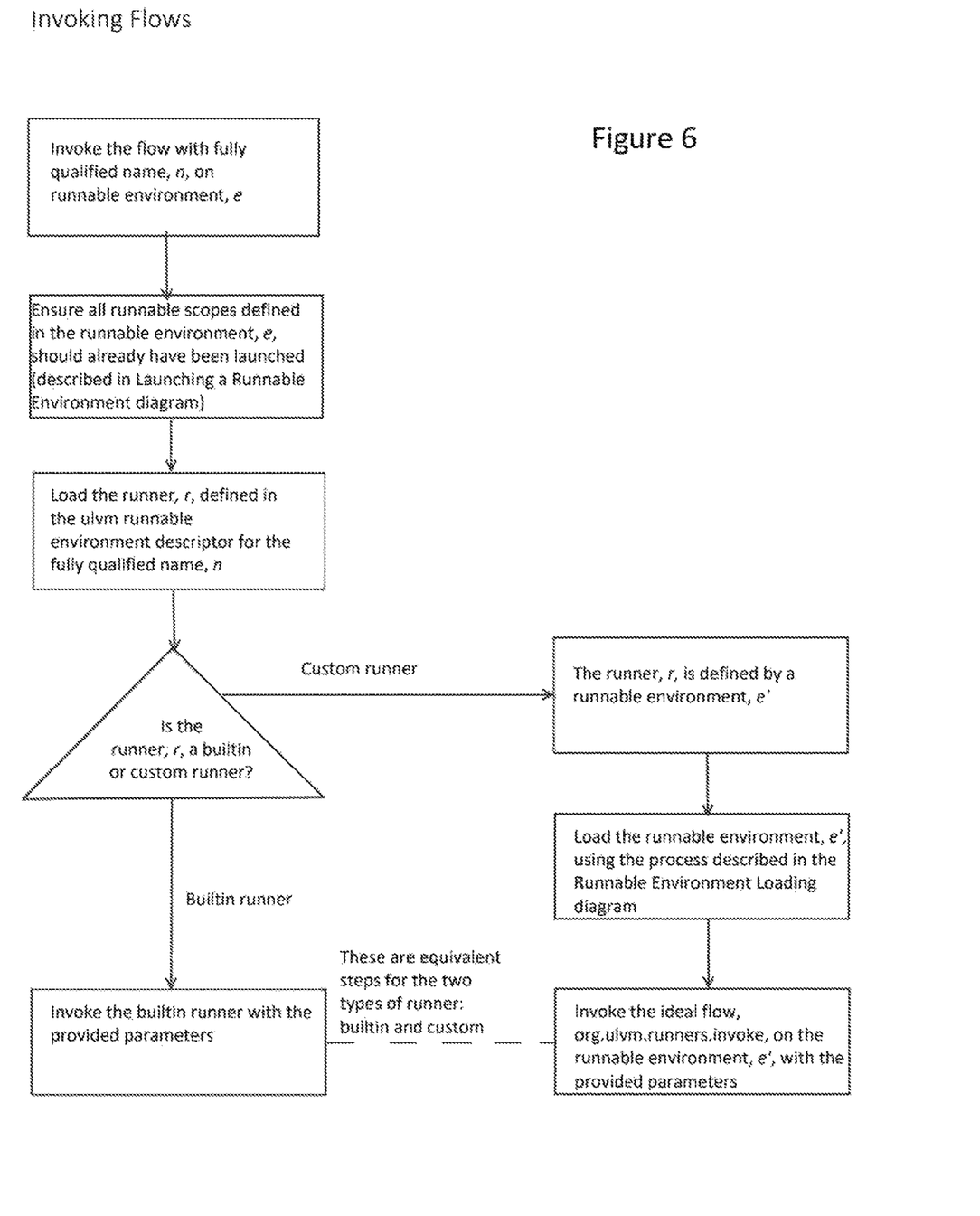
FIG. 6 is a flow diagram representing the process by which the disclosed compiler system invokes a flow.

After the common representation of the system has been read, two processes happen either serially or in parallel: the runnable environment referenced from each scope is loaded and launched and the runnable environment referenced by each module combinator is loaded and launched. The runnable environments for all scopes are collected by searching through the common representation of the system for all scope definitions and extracting the reference to a runnable environment loader embedded within them as well as the descriptor intended to direct the loader in discovering the runnable environment description. Each runnable environment is then loaded in accordance with the process depicted by FIG. 2, described below, and launched in accordance with the process depicted by FIG. 3, also described below. The runnable environments for all module combinators are collected by searching through the common representation of the system for all module combinator definitions and extracting the reference to a runnable environment loader embedded within them as well as the descriptor intended to direct the loader in discovering the runnable environment description. Each runnable environment is then loaded and run as above.

In some embodiments, each scope defined in the common representation of the system may include some configuration information that impacts the generated source code or configuration files for the scope. This configuration information may be stored in the common representation of the system and in some way associated with the definition of the scope to which it pertains. In some embodiments, the runnable environment associated with the scope may also provide some elements of such configuration. A well-known ideal flow on the runnable environment associated with the scope is invoked with any configuration information stored in the common representation of the system and any output of the flow invocation is stored by the embodiment of the disclosed system and is henceforth treated as a the configuration of the scope. The embodiment repeats this process for every scope if the associated runnable environment provides a flow that conforms to the indicated ideal flow. If no such flow is available, the configuration provided in the common representation is used, unaltered.

Similarly, in some embodiments, module combinators may contain configuration information that impacts the generated abstract syntax trees or the set of modules for which the module combinator may generate portions of abstract syntax trees. In a manner similar to that employed for scope configurations, a flow that conforms to a well-known ideal flow is invoked on each runnable environment associated with a module combinator, with the configuration provided in the common representation of the system provided as an argument. Any output is stored by the embodiment of the disclosed system and is henceforth treated as the configuration of that module combinator. The embodiment repeats this process for every module combinator if the associated runnable environment provides a flow that conforms to the indicated ideal flow. If no such flow is available, the configuration provided in the common representation is used, unaltered.

Some embodiments of the disclosed system then resolve all source-level macros. First, such embodiments collect all defined source-level macros by searching through the common representation of the system for the definitions of source-level macros. The associated runnable environments are then loaded and launched in a process analogous to that of scopes and module combinators: the runnable environment loader and descriptor associated with the source-level macro are retrieved from the common representation of the system and loaded and launched per the processes depicted in FIGS. 2 and 3. Then, the disclosed system proceeds with the following process until there are no remaining invocations of any source-level macros. The disclosed system finds the first source-level macro invocation in the common representation of the system. The ideal flow for source-level macro invocation (e.g. org.ulvm.macros.source-level.invoke) is invoked on the runnable environment associated with the source-level macro definition referenced by the invocation and it is passed arguments representing all defined scopes and their modules as well as all arguments included in the macro invocation as found in the common representation of the system. If the output of the flow includes additional scopes to add, those scopes stored and their runnable environments are loaded and launched in accordance with the process described above for all other scopes. If the output of the flow includes additional modules to add to certain scopes, the internal representation of those scopes is updated to reflect the new modules. If the output of the flow includes additional module combinators to add, the internal representation of the set of module combinators is updated to include the new module combinators and their corresponding runnable environments are loaded and launched in accordance with the process defined above for loading and launching the runnable environments for all other module combinators. If the output of the flow includes additional source-level macros to add, the internal representation of the set of source-level macros is updated to reflect the new source-level macros and the associated runnable environments are loaded and launched in accordance with the processes outlined for all other source-level macro runnable environments. Finally, if the output of the flow includes some source representation, the invocation itself is replaced with the source representation.

Note that this implies that it is possible for the source representation returned by an invocation of a source-level macro to, itself, include an invocation of another source-level macro. Some embodiments may include a limit on the number of times source representations may be transformed by source-level macros. This limit is enforced by annotating the source representation returned by any source-level macro with an invocation count equal to the annotated invocation count of the source-level macro's invocation incremented by 1. If the source-level macro's invocation has no annotated invocation count, it is presumed to be 0. If a source-level macro invocation is ever attempted such that the annotated invocation count is greater than some threshold, an error is returned. This prevents such embodiments from infinitely looping as they invoke source-level macros.

Some embodiments of the disclosed system then collect all flows defined in the common representation of the system and proceed to process as follows:

First, all transformers for any modules involved in any invocations in the flow are expanded. This is done by inspecting every invocation defined in the flow and determining whether the associated module has defined any transformers by searching for the module in the common representation. For every transformer defined for the invoked module, the embodiment evaluates the associated test by replacing all references to the calling scope in the test with the home scope defined by the enclosing flow and by replacing all references to the receiving scope in the test with the scope in which the invoked module is defined. If the test passes, the transformer is considered active and the flow portion defined by the transformer is rendered. If the transformer is indicated to be run in the calling-side, pre-request configuration, the flow portion is rendered by replacing any references to the module input parameters in the flow portion with the corresponding arguments from the module invocation. If the transformer is indicated to be run in the receiving-side, pre-request configuration, the flow portion is rendered by replacing any references to the invocation module with the receiving module. If the transformer is indicated to be run in the receiving-side, post-request configuration, the flow portion is rendered by replacing any references to the module outputs with the actual outputs resulting from the module invocation. If the transformer is indicated to be run in the calling-side, post-request configuration, the flow portion is rendered by replacing any references to to the module input parameters with the corresponding arguments to the module invocation and by treating any outputs that are suitably annotated as the corresponding outputs of the original invocation. The rendered flow portions are spliced into the flow, replacing the original module invocation, in the order: calling-side pre-request, receiving-side pre-request, receiving-side post-request, calling-side post-request.

In the case where a module with an associated transformer is defined with inputs tied to the parameters of its flow, the foregoing is applied to each invocation of that flow from other flows. In such cases, the test will be evaluated with the calling scope set to the calling flow's home scope and the receiving scope set to the scope in which the receiving module is defined. Additionally, the test will be evaluated with the calling scope set to a special sentinel value indicating that the calling scope is unknown. In such cases, wrappers for the flow are generated which apply every receiving-side transformer for which the associated test passed when the sentinel value was provided for the calling scope.

Some embodiments of the disclosed system then check the logical properties of the flow. This is done by first ordering the invocations according to a topological sort, which implies that an invocation, A, whose output provides a value to the input of another invocation, B, is ordered such that A comes before B. As part of the topological sort, a check is done to ensure that no loops exist in the invocation graph, where a loop is defined as a sequence of invocations such that any of the arguments provided to a module invocation (A) may be traced back through zero or more module invocations to arrive at any output of that module invocation. This stage will rely on some logic verification or satisfiability tool, such as a satisfiability modulo theories (SMT) solver, a horn clause solver, or an automated theorem prover. To begin, all logical relations that are not directly associated with a module or an invocation are added to the logic environment. This will include logical implications such as those that propagate properties that apply to the inputs of modules to also apply to the outputs of modules as well as any logical assumptions that the designer or programmer manually asserted to hold for certain values and any properties declared by scopes, modules, or flows. For example, one such property that may be declared on a module is the property that only one of a particular set of parameters may be provided. One logical check that some embodiments add by default ensures that, unless two parameters are declared to be part of such a set, no module may be invoked with arguments that are derived from two separate output types of any given module. The system then processes each invocation in the order in which it appears in the topological sort. Given the logical environment prior to processing the invocation, the system verifies that the required properties of the inputs of the invocation hold. In the language of proofs, this equates to checking that the given set of logical assertions is valid, meaning that it is true for any assignment of truth values to variables. In a SMT solver, this would consist of ensuring that the negation of each required property of the inputs of the invocation is not satisfiable given the existing logical environment. That is, check that there exists no assignment of truth values to variables that would cause the required property to be false. If the values supplied as the inputs to the invocation in question are provided by a module which is associated with a different scope than that associated with the current module, any properties required of values leaving the "calling scope" are verified in the same manner as the inputs were verified. Similarly, any properties required of values entering the "receiving scope" are verified in the same manner as the inputs were verified. Additionally, scopes may require some properties of any modules included in the scope. These properties will be verified in the same manner as the inputs were verified. Once the system has shown that the required properties of the input values and all scope-supplied required properties hold, the asserted properties of the output values are added to the logical environment and the checking proceeds in the same fashion with the next invocation.

Figure 7:
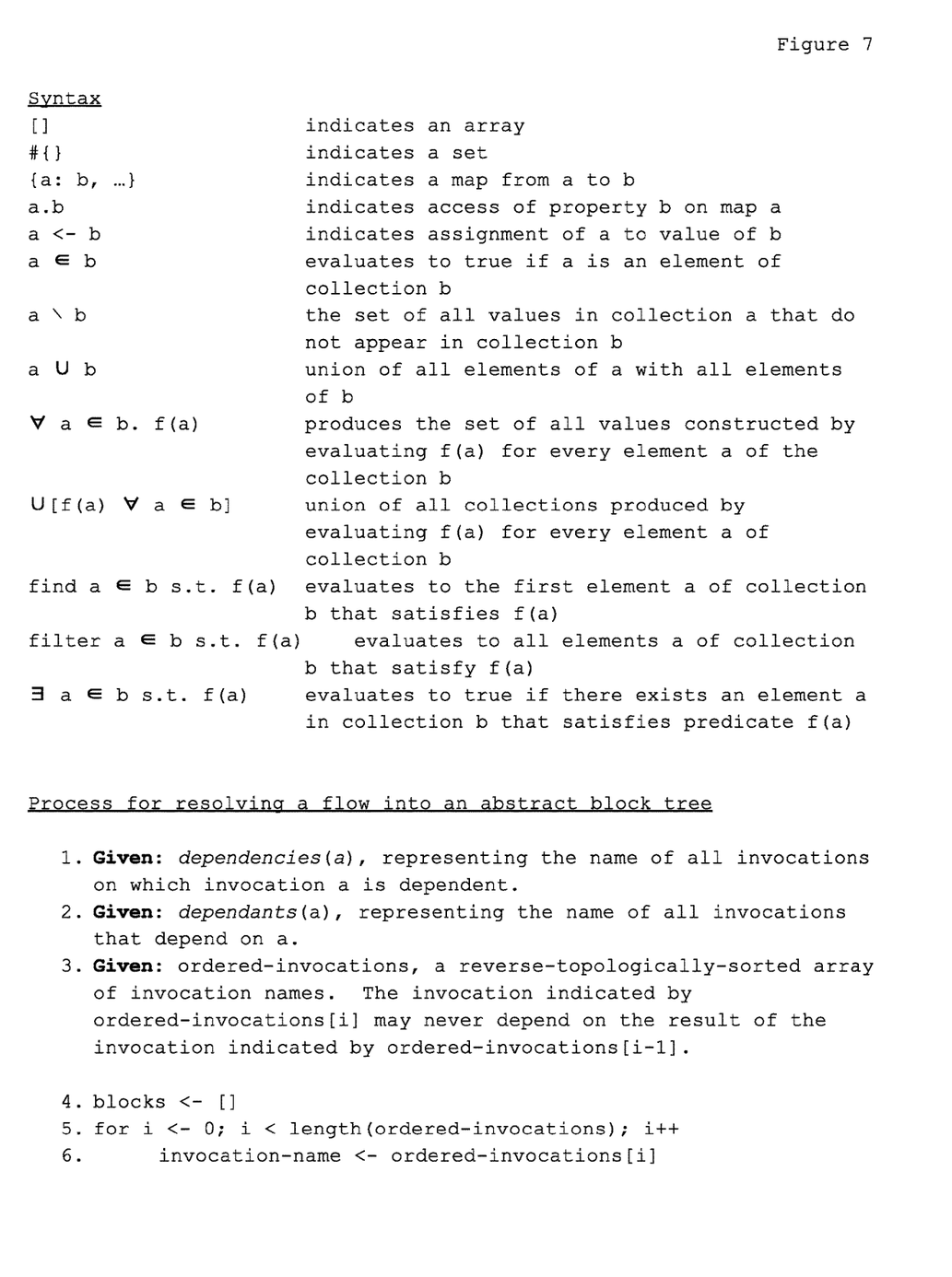
FIG. 7 is a pseudo code listing of the process for resolving a flow into an abstract block tree.

Some embodiments of the disclosed system then transform each flow from a series of descriptions of module invocations into an abstract block tree. In this context, a "block" refers to an abstract representation of a block of code in any target programming language, where a block of code is some structure in the target language within which variables defined therein may be freely and safely referenced. The flow is partitioned such that each partition consists of exactly those invocations comprising the flow whose modules are in the same scope. Each such partition is transformed into an abstract block tree individually. The method by which the disclosed system transforms the representation of each flow into an abstract block tree is demonstrated in FIG. 7.

Some embodiments of the disclosed system then apply transformations to the abstract block tree. Each transformation is implemented in a runnable environment. For each transformation, the system loads and launches the runnable environment using the methods described above and invokes a well-known ideal flow on that runnable environment, passing a representation of the abstract block tree to it. The ideal flow then returns a representation of the transformed abstract block tree. This transformed representation is then passed to the next transformer for further transformation.

Some embodiments of the disclosed system then process the abstract block tree into one or more abstract syntax trees. The process by which an abstract block tree is processed into an abstract syntax tree is as follows. Starting from the leaves of the abstract block tree and recursing up the tree, the disclosed system first looks up the module combinator for the modules comprising the invocations of the block. For each block, the system finds the first module combinator in the list of module combinator assignments for which the associated predicate evaluates to true when applied to the set of modules comprising the invocations of the block. Similarly to that used for logical assertions, the predicates may be represented by any suitable language that represents a system of logic. Having determined the module combinator for the invocation block, the disclosed system then invokes a well-known ideal flow on the runnable environment associated with the module combinator that was previously launched, passing the abstract block definition as well as the abstract syntax trees produced by the child blocks of the abstract block. The invocation is performed as described above and returns a new abstract syntax tree that will typically include the abstract syntax trees for each child block.

Some embodiments of the disclosed system permit designers and programmers to specify initialization procedures for each scope. These initialization procedures are defined in a manner identical to that of flows but with the caveat that they may not accept any arguments to their invocation. These initialization flows are processed in the same manner as regular flows, described above.

Having constructed an abstract syntax tree for each initialization flow for each scope and for each scope involved in each flow, some embodiments then invoke a well-known ideal flow on the runnable environment associated with the relevant scope for each such flow, passing the abstract syntax tree. The implementation of the ideal flow typically renders the source code corresponding to the provided abstract syntax tree to a source file artifact. Some elements of the abstract syntax tree may represent template variables and such variables will be rendered as template variables in the resultant source file artifacts, to be filled in at a later stage of compilation. These source file artifacts, combined with any generated configuration artifacts, are typically written to a medium such as a file system, where each scope's source artifacts are comprised of one or more such source and configuration artifacts, or where many scopes' source artifacts are combined into one or more such source and configuration artifacts.

Some embodiments of the disclosed system then invoke a well-known ideal flow on the runnable environment associated with each scope, passing a mapping of template variables to values. This mapping is provided by the user of the system and may take the form of a file provided to the compilation system, a URL from which the mapping may be downloaded, or any other means. It is possible to have many such mappings that are used for any given system definition. In this manner, these mappings may define properties of the environment into which the compiled system is to be deployed. For example, one such mapping may represent a configuration for a testing instance of the system while another represents a configuration for a production instance of the system. The implementation of that ideal flow typically produces a set of finalized source artifacts with all template variables replaced by their corresponding values. During this stage, the embodiment may invoke another well-known ideal flow on the runnable environment associated with each scope to generate a version identifier. Such a version identifier will often consist of a hash function applied to the contents of the finalized source artifacts and may also include a human-understandable version identifier.

Some embodiments of the disclosed system then invoke a well-known ideal flow on the runnable environment associated with each scope to compile the finalized source artifacts into compiled artifacts. The typical implementation of that well-known ideal flow will consist of invoking a source code compiler for the target language of the scope.

Some embodiments of the disclosed system then support the ability to stage compiled artifacts for future deployment. These embodiments implement this functionality by invoking a well-known ideal flow on the runnable environment associated with each scope, passing in user-provided values to direct the location at which and manner in which the artifacts are staged. A typical implementation of artifact staging will consist of transferring the compiled artifacts to another server that is accessible from a production environment.

Some embodiments of the disclosed system then support the ability to deploy the staged artifacts into a computational environment. These embodiments invoke a well-known ideal flow on a runnable environment specified by the designer or programmer to ascertain the current state of the artifacts running in the computational environment. The current state is represented as a set of versions that are currently active for each scope in the deployed system and for each scope in the to-be-deployed system. These embodiments then invoke a well-known ideal flow on a runnable environment specified by the designer or programmer to determine the deployment plan. The deployment plan is represented as a tree of steps where each step consists of a runnable environment to launch and a runnable flow on the provided runnable environment to invoke. Child steps are chosen based upon the result value of the invoked flow. The user may be permitted to view the deployment plan prior to executing it. Once execution commences, the embodiments will begin execution from the root of the deployment plan tree by launching the indicated runnable environment and invoking the corresponding runnable flow. The predicate for each child step will be evaluated with the flow invocation result and the step corresponding to the first such predicate that evaluates to true will be chosen as the next step to execute. The embodiments will proceed until no additional steps are found. The result value of the last executed step will be considered the result of the deployment.

The various embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be understood that the embodiments described herein are merely exemplary and that a person skilled in the art may make many variations and modifications without departing from the spirit and scope of the invention. All such variations and modifications are intended to be included within the scope of the invention.

What is claimed is:

1. A system compiler, comprising:
   a means of defining in source code one or more scopes, each realized as an environment of computational resources when deployed, each such environment comprising one or more of processing, networking, memory, or storage resources, organized into a hierarchy such that, when deployed, the environment of computational resources of any child scope exists within and as an aggregate of a portion of the computational environment of its parent, where each such scope may provide one or more modules, available to execute within the scope's computational resources;
   a means of defining in source code one or more flows, each of which accepting one or more parameters and returning one or more sets of outputs, and each of which comprised of a set of connections between literal data elements, flow parameters, or outputs of module invocations and the inputs of other module invocations or one of the sets of outputs of the flow;
   a means of generating, for each defined scope, configuration files and source code in a target computer language of that scope which implements the invocations of modules provided by that scope as defined in the one or more flows, such that each implementation of an invocation is generated by user-provided module combinators;
   a means of generating an intermediate representation of a module invocation comprising a portion of one or more flows that reside within a scope and converting the intermediate representation into an abstract syntax tree by querying a module combinator associated with the invocation to retrieve the module combinator's portion of the abstract syntax tree;
   a means of converting the abstract syntax tree into the configuration files and source code, compiling the configuration files and source code into compiled artifacts, and deploying the compiled artifacts to a production environment.

2. The system compiler as recited in claim 1, wherein is also provided a means of including some template variables in the configuration files and generated source code for each scope.

3. The system compiler as recited in claim 2, wherein is also provided a means of replacing the template variables included in the configuration files and generated source code for each scope with values provided by the user.

4. The system compiler as recited in claim 1, wherein a transformation is applied to provided source code, which produces a desired format of input representation, as a first step of processing.

5. The system compiler as recited in claim 1, wherein is also provided a means of generating, for each defined scope, configuration files which, when provided to a suitable external processing system with artifacts generated by compiling target source code generated for that scope, cause the creation of an environment of computational resources indicated by the scope configuration.

6. The system compiler as recited in claim 1, wherein each module may produce exactly one of a set of output types, each of which may contain multiple values and wherein the user may provide one or more module combinators that may generate source code that conditions the further invocation of modules in a flow on the runtime determination of which of the set of output types was produced such that only one subsequent path through a provided flow that relied upon the runtime-produced output will be taken.

7. The system compiler as recited in claim 1, wherein the user may, specify logical assertions concerning modules, module parameters, module output types and output values, specific values, scopes, flows, the relation between module arguments and module outputs, and the relation between module invocations and wherein such assertions are verified to hold.

8. The system compiler as recited in claim 1, wherein the user may specify a derived module, consisting of a source module paired with a flow to run, a configuration indicating whether to run the flow before or after the source module, a configuration indicating whether to run the flow in a calling or receiving scope, and a predicate function taking the calling and receiving scope configurations as input and indicating whether the flow should be included.

9. An open compiler system, comprising:
   a means of a user providing one or more definitions of scopes, each realized as an environment of computational resources when deployed, each such environment comprising one or more of processing, networking, memory, or storage resources;
   a means of a user providing one or more definitions of modules that each of one or more scopes may provide;
   a means of a user providing one or more flows connecting literal values, top-level parameters, or the outputs of some module invocations to the inputs of other module invocations or to top-level outputs;
   a means of a user providing, as input into the compilation process, one or more module combinators that may be invoked during compilation, which convert a module definition, one or more child abstract syntax trees, and source module definitions into a resultant abstract syntax tree;
   a means of invoking those module combinators in the appropriate order and with appropriate arguments so as to generate one abstract syntax tree for each combination of scope and flow, each such abstract syntax tree semantically correct in a target language for its scope and effecting the runtime invocation of each module with appropriate parameters, each such runtime invocation appropriately guarded by conditionals, in correspondence to the user-provided flows;

a means of a user providing one or more macros, wherein a macro invocation returns a source representation that, itself, may provide invocations of one or more additional macros, wherein the number of times a source representation may be transformed by a macro is constrained by a value annotated in a source representation.

10. The open compiler system as recited in claim 9, wherein the user may provide a computation that converts the one or more resultant abstract syntax trees into source code and wherein such computations are invoked by the compiler after generating the necessary abstract syntax trees.

11. The open compiler system as recited in claim 9, wherein the user may provide macros that, if an invocation appears in user-provided source code, are invoked by the compiler and which may provide one or more of: an additional set of modules to add to each defined scope, one or more additional scopes to define, one or more additional flows to define, or some portion of a representation that should syntactically replace the macro invocation.

12. The open compiler system as recited in claim 9, wherein runnable environments for all user-provided computations may be retrieved using a user-provided or built-in artifact loader.

13. The open compiler system as recited in claim 9, wherein all user-provided runnable flows may be invoked using a user-provided or built-in runner.

14. The open compiler system as recited in claim 9, wherein the user may provide a computation that may be invoked to determine the current state of a deployed system.

15. The open compiler system as recited in claim 14, wherein the user may provide a computation that may be invoked to determine a deployment plan and wherein that deployment plan is executed by iteratively querying the user-provided computation to determine the current state of the system and then invoking user-provided computations as indicated by the deployment plan.

\* \* \* \* \*